United States Patent
Garrett et al.

(10) Patent No.: US 11,672,064 B2
(45) Date of Patent: Jun. 6, 2023

(54) SYSTEM AND METHOD FOR VARIABLE INTENSITY PATTERNS

(71) Applicant: Whelen Engineering Company Inc., Chester, CT (US)

(72) Inventors: Caleb Garrett, Essex, CT (US); Dave Sousa, Ivoryton, CT (US)

(73) Assignee: WHELEN ENGINEERING COMPANY, INC., Chester, CT (US)

( * ) Notice: Subject to any disclaimer, the term of this patent is extended or adjusted under 35 U.S.C. 154(b) by 0 days.

(21) Appl. No.: 17/342,821

(22) Filed: Jun. 9, 2021

(65) Prior Publication Data

US 2021/0307143 A1 Sep. 30, 2021

Related U.S. Application Data

(63) Continuation of application No. 16/254,730, filed on Jan. 23, 2019, now Pat. No. 11,064,589.

(51) Int. Cl.
*H05B 45/40* (2020.01)
*B60Q 1/52* (2006.01)
*H05B 45/10* (2020.01)
*H05B 45/325* (2020.01)
*H05B 47/11* (2020.01)

(52) U.S. Cl.
CPC ............... *H05B 45/40* (2020.01); *B60Q 1/52* (2013.01); *H05B 45/10* (2020.01); *H05B 45/325* (2020.01); *H05B 47/11* (2020.01)

(58) Field of Classification Search
CPC ........ H05B 45/10; H05B 45/14; H05B 45/20; H05B 45/40; H05B 47/11; H05B 47/115; B60Q 1/52
See application file for complete search history.

(56) References Cited

U.S. PATENT DOCUMENTS

| | | | | |
|---|---|---|---|---|
| 4,329,677 A | * | 5/1982 | Markl | G08G 1/09 340/331 |
| 5,159,642 A | * | 10/1992 | Kosaka | H04N 7/188 382/134 |
| 7,215,891 B1 | * | 5/2007 | Chiang | H04B 10/40 398/195 |
| 7,621,653 B2 | * | 11/2009 | Hendrie | F21L 4/027 362/249.05 |
| 8,264,158 B2 | * | 9/2012 | Huang | H05B 45/54 315/192 |

(Continued)

FOREIGN PATENT DOCUMENTS

DE    102016001487 A1    8/2017

OTHER PUBLICATIONS

PCT International Search Report and Written Opinion of the International Searching Authority dated Aug. 8, 2019 in corresponding Application No. PCT/US2019/020687, 12 pages.

*Primary Examiner* — Abdullah A Riyami
*Assistant Examiner* — Syed M Kaiser
(74) *Attorney, Agent, or Firm* — Hogan Lovells US LLP

(57) ABSTRACT

A system, method and storage medium for providing an emergency lighting includes generating, by a controller, a driving control signal; receiving, by a light source, the driving control signal; and emitting, by the light source, light based on the driving control signal. Intensity of the light emitted from the light source repeatedly ramps up and ramps down with a first period based on the driving control signal.

29 Claims, 9 Drawing Sheets

(56) References Cited

U.S. PATENT DOCUMENTS

| | | | | |
|---|---|---|---|---|
| 10,309,613 B2* | 6/2019 | Adams | | H05B 47/18 |
| 11,064,589 B2* | 7/2021 | Garrett | | H05B 47/11 |
| 2003/0038985 A1* | 2/2003 | Kurosawa | | H04N 1/32561 |
| | | | | 358/468 |
| 2003/0052904 A1* | 3/2003 | Gu | | G09G 3/3216 |
| | | | | 345/691 |
| 2005/0001562 A1* | 1/2005 | Pederson | | H05B 45/14 |
| | | | | 362/800 |
| 2006/0091817 A1* | 5/2006 | Herrig | | B60Q 1/38 |
| | | | | 340/331 |
| 2007/0153512 A1* | 7/2007 | Hendrie | | F21V 23/0414 |
| | | | | 362/231 |
| 2008/0018261 A1* | 1/2008 | Kastner | | H05B 45/10 |
| | | | | 315/192 |
| 2008/0106218 A1* | 5/2008 | Zulch | | H05B 45/10 |
| | | | | 315/291 |
| 2009/0322800 A1* | 12/2009 | Atkins | | G09G 3/3413 |
| | | | | 345/102 |
| 2010/0067887 A1* | 3/2010 | Nakai | | H04N 5/232123 |
| | | | | 396/48 |
| 2010/0090613 A1* | 4/2010 | Spartano | | F21L 4/027 |
| | | | | 315/321 |
| 2010/0194525 A1* | 8/2010 | Do | | G08B 21/043 |
| | | | | 340/5.1 |
| 2011/0012746 A1* | 1/2011 | Fish, Jr. | | H05B 47/115 |
| | | | | 340/815.45 |
| 2011/0057572 A1* | 3/2011 | Kit | | H05B 45/375 |
| | | | | 315/246 |
| 2011/0062888 A1* | 3/2011 | Bondy | | H05B 45/10 |
| | | | | 315/294 |
| 2012/0075360 A1* | 3/2012 | Messmer | | G09G 3/3426 |
| | | | | 345/102 |
| 2012/0101343 A1* | 4/2012 | Duffy | | A61B 5/489 |
| | | | | 600/249 |
| 2012/0206064 A1* | 8/2012 | Archenhold | | H05B 45/385 |
| | | | | 315/297 |
| 2013/0088595 A1* | 4/2013 | Nauert | | H04N 7/18 |
| | | | | 340/471 |
| 2013/0314711 A1* | 11/2013 | Cantin | | B60Q 1/0023 |
| | | | | 356/445 |
| 2014/0009081 A1* | 1/2014 | Fujiwara | | H03K 7/08 |
| | | | | 327/175 |
| 2014/0301101 A1* | 10/2014 | Russ | | B60Q 1/44 |
| | | | | 362/520 |
| 2014/0340214 A1* | 11/2014 | McLoughlin | | B60Q 1/245 |
| | | | | 340/472 |
| 2015/0077555 A1* | 3/2015 | Scalisi | | G07C 9/00563 |
| | | | | 348/143 |
| 2015/0204561 A1* | 7/2015 | Sadwick | | G05D 23/1905 |
| | | | | 236/1 C |
| 2015/0257242 A1* | 9/2015 | Deyaf | | H05B 45/10 |
| | | | | 315/77 |
| 2017/0089532 A1* | 3/2017 | Oltheten | | F21S 9/022 |
| 2017/0246988 A1* | 8/2017 | Ihedinmah | | B60Q 1/547 |
| 2017/0368677 A1* | 12/2017 | Rotenberg | | F21V 21/08 |
| 2018/0042083 A1* | 2/2018 | Couch | | H05B 45/58 |
| 2018/0372537 A1* | 12/2018 | Jones | | H05B 47/11 |
| 2019/0014461 A1* | 1/2019 | Winkle | | G08G 5/0056 |

* cited by examiner

| TIME | COMPUTED PI | INTENSITY DATA OUTPUT OF MC | DUTY CYCLE OF PWM SIGNAL |
|---|---|---|---|
| t1 | $I_{11}$ | $DATA_{11}$ | $DC_{11}$ |
| t2 | $I_{12}$ | $DATA_{12}$ | $DC_{12}$ |
| t3 | $I_{13}$ | $DATA_{13}$ | $DC_{13}$ |
| ... | ... | ... | ... |
| tmax | $I_{1max}$ | $DATA_{1max}$ | $DC_{1max}$ |
| ... | ... | ... | ... |
| t1' | $I_{11'}$ | $DATA_{11'}$ | $DC_{11'}$ |

FIG. 3

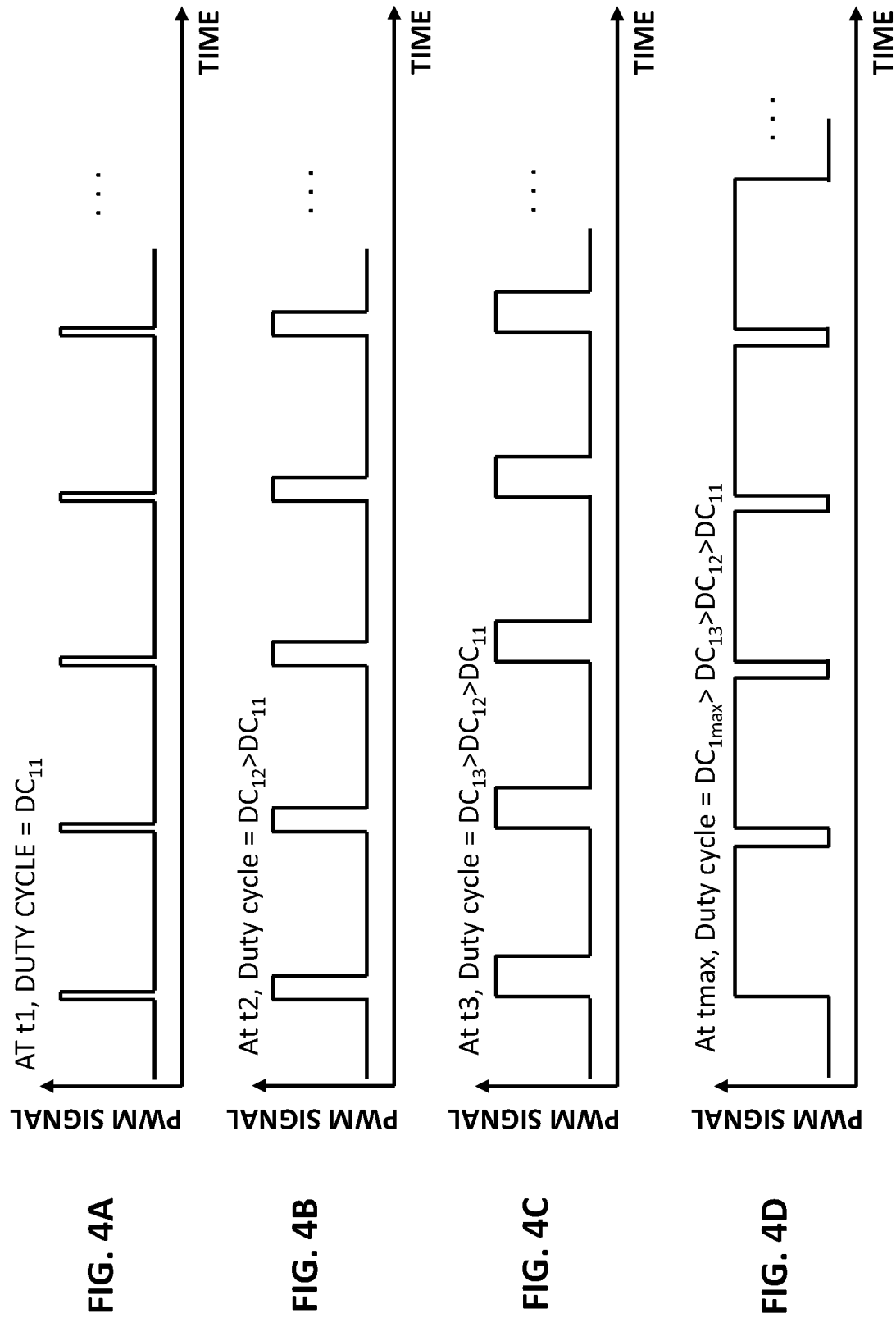

SYSTEM AND METHOD FOR VARIABLE INTENSITY PATTERNS

TECHNICAL FIELD

This application relates to a lighting system used in an emergency warning industry, and more particularly to, a lighting system and a method driving the system for generating variable intensity patterns of emergency light.

BACKGROUND

When emergency situations such as occurrences of disasters, car accidents, crimes, etc. take place, warning lighting around emergency scenes or emergency vehicles are often used. Light sources such as light-emit diodes (LEDs) are used to provide unprecedented levels of brightness and efficiency. While first responders have never been more visible, this technology can often be counterintuitive.

Studies have shown that people tend to stare at bright flashing lights, meaning that drivers are more likely to take their eyes off the road in the presence of active emergency light sources, and thus, the impaired drivers may tend to drive where they are looking. This can be supported by the fact that many drivers have experienced while driving at night a scenario where LED emergency lights are so bright that they become only to see the LED light and asynchronicity of the high frequency flash patterns amongst emergency vehicles, thus resulting in a disorienting effect.

Thus, there is a need for a new emergency lighting method and system to ease the disorienting effect for securing the first responders' safety.

SUMMARY OF THE INVENTION

The objective of the present disclosure is to provide emergency warning lighting that can be visible or recognized at night without distracting drivers. Aspects of the present disclosure are a system, method and storage medium for providing the emergency warning lighting without making drivers to be distracted by dynamically varying intensity flash patterns of light.

In one aspect, there is provided a system for providing an emergency lighting system. The system includes a controller and a light source. The controller is configured to generate a driving control signal. The light source is configured to receive the driving control signal and emit light based on the driving control signal. Intensity of the light emitted from the light source repeatedly ramps up and ramps down repeatedly with a first period based on the driving control signal.

In one embodiment, the driving control signal is generated based on a plurality of intensity values of the light source computed by the controller, each of the plurality of intensity values corresponding to a respective plurality of time points.

In one embodiment, at least one parameter of the driving control signal is gradually adjusted to have at least one intermediate value between a maximum value corresponding to a top peak of the intensity of the light and a minimum value corresponding to a bottom peak of the intensity of the light.

In one embodiment, the driving control signal is based on a pulse width modulation signal, and the controller is further configured to adjust a duty cycle of the pulse width modulation signal based on each of the computed plurality of intensity values to generate the driving control signal.

In one embodiment, the driving control signal is based on a pulse width modulation signal, and the at least one parameter of the driving control signal is a duty cycle of the pulse width modulation signal.

In one embodiment, the controller is further configured to: adjust the duty cycle of the pulse width modulation signal to a first duty cycle at a first of the time points, based on a first of the computed plurality of intensity values; control the light source to emit the light with the first intensity value; adjust the duty cycle of the pulse width modulation signal to a second duty cycle at a second of the time points, based on a second of the computed plurality of intensity values; and control the light source to emit the light with the second intensity value. The second time point is adjacent to the first time point.

In one embodiment, the duty cycle of the pulse width modulation signal adjusted at the first time point is maintained until the second time point.

In one embodiment, the duty cycle of the driving control signal gradually varies between the first time point and the second time point from the first duty cycle to the second duty cycle.

In one embodiment, the system further includes another light source, and the controller is further configured to generate another driving control signal, and the another light source is configured to receive the another driving control signal and emit another light based on the another driving control signal. Intensity of the another light emitted from the another light source ramps up and ramps down repeatedly with a second period based on the driving control signal.

In one embodiment, the second period is different from the first period.

In one embodiment, at least one of the maximum value and the minimum value of the driving control signal is different from a corresponding one of the another driving control signal.

In one embodiment, the another light source and the light source are implemented with a light array bar.

In one embodiment, the controller further includes a pulse width modulation driver configured to generate the driving control signal based on the plurality of intensity values.

In one embodiment, the controller further includes at least one of a direct-memory access controller, a serial-to-parallel converter, a floating point unit and a real-time operating system.

In another aspect of the present disclosure, there is provided a method for driving a lighting system. The method includes: generating, by a controller, a driving control signal; receiving, by a light source, the driving control signal; and emitting, by the light source, light based on the driving control signal. Intensity of the light emitted from the light source repeatedly ramps up and ramps down with a first period based on the driving control signal.

In still yet another aspect of the present disclosure, there is provided a computer-readable storage medium having computer readable program instructions. The computer readable program instructions can be read and executed by at least one processor for performing a method. The method includes: generating, by a controller, a driving control signal; receiving, by a light source, the driving control signal; and emitting, by the light source, light based on the driving control signal. Intensity of the light emitted from the light source repeatedly ramps up and ramps down with a first period based on the driving control signal.

BRIEF DESCRIPTION OF THE DRAWINGS

The present disclosure will become more readily apparent from the specific description accompanied by the drawings.

FIG. 3 is an example diagram illustrating relationships among percentage light intensities computed with respect to an LED element, output intensity data of a microcontroller, and duty cycles of a PWM driving signal, according to an exemplary embodiment of the present disclosure;

FIGS. 4A to 4D illustrate example diagrams of a PWM driving signal whose duty cycle varies to adjust light intensity of an LED element according to an embodiment of the present disclosure;

DETAILED DESCRIPTION

Figure 1:
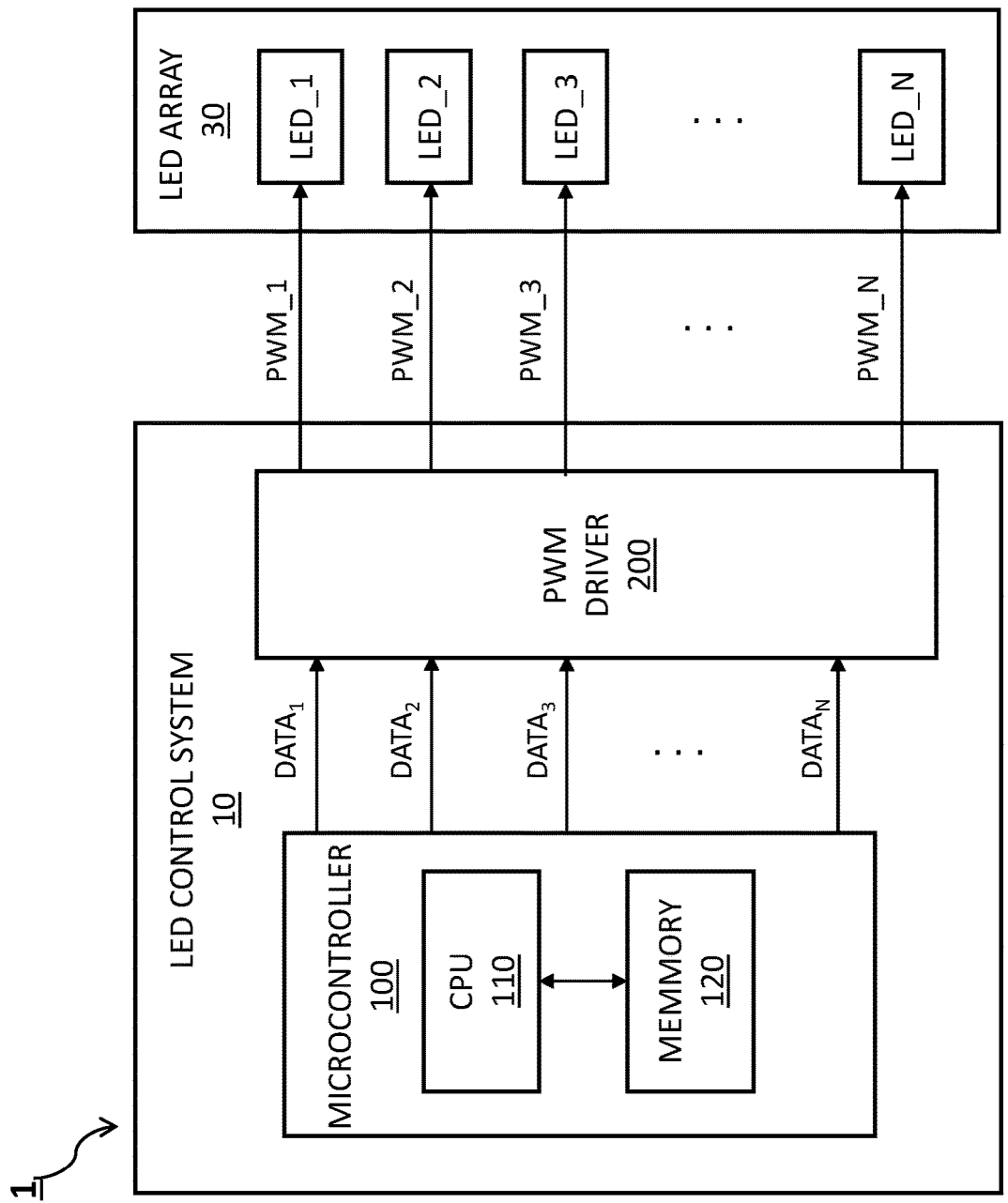
FIG. 1 is a block diagram of an example emergency lighting system according to an exemplary embodiment of the present disclosure.

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The emergency lighting system according to an exemplary embodiment of the present disclosure provides an emergency warning light that can be visible or recognized at night without making distractions. To this end, the emergency lighting system according to an exemplary embodiment of the present disclosure is configured to drive each light source therein to emit light with dynamically variable flash intensity patterns of light. For example, each light source can be driven to emit light with a flash intensity pattern where light intensity "ramps-up" and "ramps-down" to flash rather than simply turning on and off a light source; in addition, peak intensities of the light source can continuously be variable (e.g., not completely turned on or not completely turned off). The proposed emergency lighting system can produce emergency flash patterns that make it easier for the human eye to adjust, thus reducing drivers' distraction. These proposed emergency flash patterns can also minimize the disorienting, known as a "strobe effect" and thus can improve drivers' attention and visibility for securing the safety of first responders. Additionally, directional and sequential patterns that indicate desired actions or directions can improve resolution of the emergency lighting, thus reducing the confusion of oncoming traffics.

In one embodiment, the emergency lighting system according to an exemplary embodiment of the present disclosure relies on a computing system including processor (s), software architectures or algorithms to provide the feature of a "computational lighting". For each light element of a lighting array of the emergency lighting system, the computing system computes percentage intensities as a mathematical function of time (or phase). This function can be discrete or time-continuous over time, and is computed, e.g., hundreds of times per second. If the function is discrete, data (e.g., intensity data) associated with the function can be stored as a lookup table in memory of the computing system or an external storage device.

It will be appreciated that the percentage intensity is a relative intensity corresponding a fraction of the maximum intensity that each light element emits at a certain time point. Thus, the terms "percentage intensity" and "relative intensity" are interchangeable throughout the present disclosure. It will also be appreciated that the higher the percentage intensity (or the relative intensity), the brighter each light element is. In one embodiment, the intensity of light emitted by each light element is adjusted by adjusting a duty cycle of a pulse width modulation (PWM) driving signal to be injected thereto. For example, if the computed percentage intensity is increased, the duty cycle of the PWM driving signal is adapted to be increased, or vice versa.

In one embodiment, the emergency lighting system according to an exemplary embodiment of the present disclosure includes a serial-to-parallel converter that performs a rapid serial-to-parallel conversion of intensity data corresponding to, e.g., PWM states to support a light array with multiple and/or variable number of lighting elements. This allows a light element to be toggled thousands of times per second.

Figure 2:
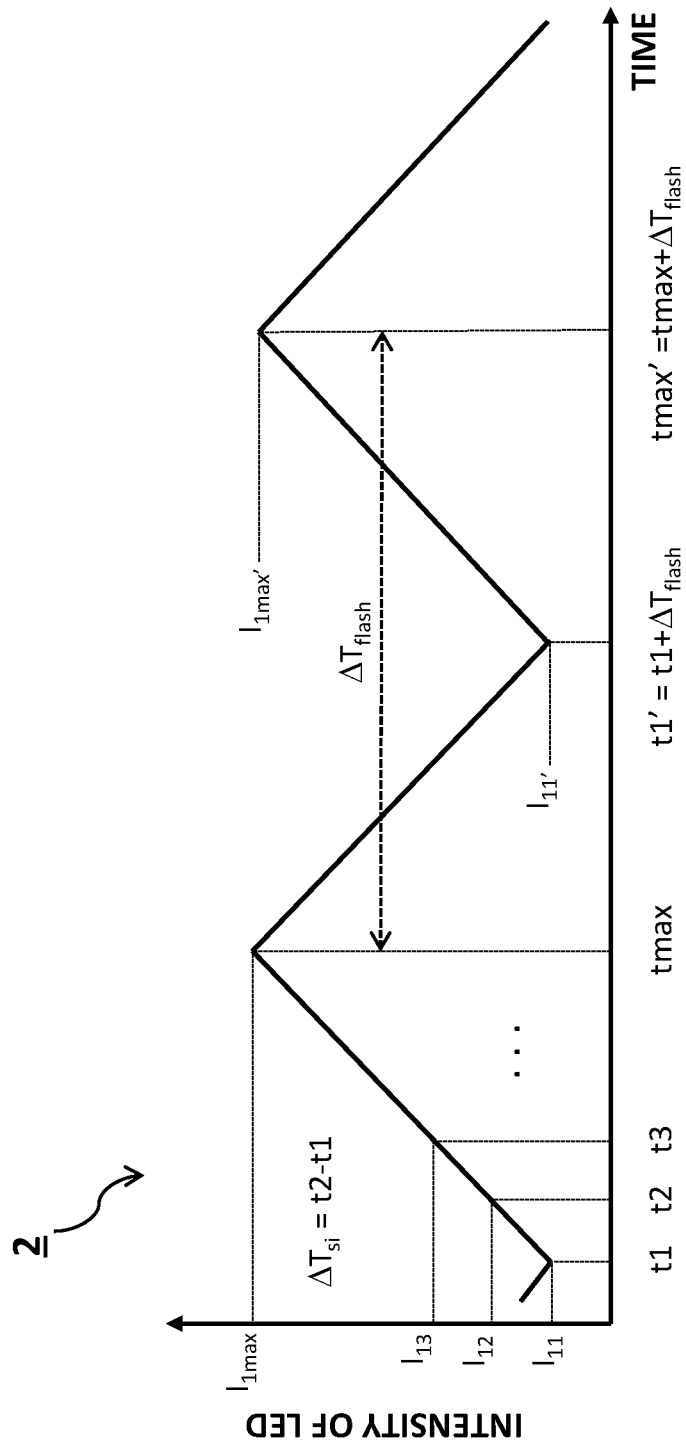
FIG. 2 is an example diagram illustrating an intensity variation curve of light emitted by an LED element according to an exemplary embodiment of the present disclosure.

FIG. 1 is a block diagram of an example emergency lighting system 1 according to an exemplary embodiment of the present disclosure. The emergency lighting system 1 can be installed to be attached on an emergency vehicle or in the vicinity thereof. FIG. 2 is an example diagram illustrating an intensity variation curve 2 of light emitted by a lighting element (e.g., LED_1) of an LED array 30 according to an exemplary embodiment of the present disclosure. FIG. 3 is an example diagram illustrating relationships among percentage light intensities computed with respect to the lighting element (e.g., LED_1), output intensity data of the microcontroller 100, and duty cycles of a PWM driving signal, according to an exemplary embodiment of the present disclosure.

Although it is illustrated in FIG. 1 that the light elements constituting the lighting array are light-emitting diodes (LEDs), however embodiments of the present disclosure are not limited thereto. The lighting elements can be implemented with any type of light sources.

Referring now to FIG. 1, the emergency lighting system 1 includes an LED array 30 configured to provide a flash intensity light pattern and an LED control system 10 configured to control the operation of the LED array 30. As shown in FIG. 1, the LED control system 10 includes at least one central processing unit (CPU) 110 (e.g., processor) and memory 120 coupled to the CPU 110, and a PWM driver 200. The CPU 110 and the memory 120 may constitute a microcontroller 100. The LED array 30 may be implemented as a light bar including a plurality of LED elements LED_1 to LED_N. The intensity of light emitted by the respective LED elements LED_1 to LED_N can independently be controlled (or driven) by the controller 100. In one embodiment, some or all the LED elements of the LED array 30 have the same flash light pattern one as another. In another embodiment, some or all the LED elements of the LED array 30 have different flash light patterns one from another. It will be appreciated that when a flash light pattern of one LED element is different from another LED element, intensity patterns emitted from the two LED elements are different from each other.

For each of the LED elements LED_1 to LED_N, the CPU 110 computes percentage light intensities as a mathematical function of time (or phase) and stores the computed percentage light intensities into the memory 120. The stored percentage intensities computed as the mathematical function can be discrete such as a lookup table or time-continuous. Referring to FIG. 2, the percentage light intensities of each LED element LED_1 to LED_N ramps up to a top peak of the intensity variation curve 2 and ramps down to a bottom peak thereof, thus generating a flash light pattern with a slowing-varying envelope, which is distinguished from conventional technologies where LEDs are simply turned on or off, which causes drivers' distractions.

For example, further particularly for the LED element LED_1, as illustrated in FIG. 2, the output light intensity of the LED element LED_1 starts increasing at a time t1 with a first bottom peak intensity $I_{11}$ to ramp up to a first top peak intensity $I_{1max}$ at a time tmax and ramps down to a second bottom peak intensity $I_{11'}$ at t1'. Further, the intensity ramps up to a second top peak $I_{1max'}$ at a time tmax' and ramps down again. This ramp up and down intensity variation is repeated with a predetermined flash pattern period $\Delta T_{flash}$. Thus, the time t1' is equal to t1+$\Delta T_{flash}$ (e.g., t1'=t1+$\Delta T_{flash}$), and the time tmax' is equal to tmax+$\Delta T_{flash}$ (e.g., tmax'=tmax+$\Delta T_{flash}$).

The intensities (e.g., $I_{11}$, $I_{12}$, $I_{1max}$, $I_{11'}$, $I_{1max'}$) on the intensity variation curve 2 illustrated in FIG. 2 correspond to percentage intensities, respectively, computed by the microcontroller 100. In one embodiment, the percentage intensities are stored in discrete data over time. The intensity variation curve 2 may be a discrete curve while it is illustrated as a continuous curve in FIG. 2. In this case, the number of intensity levels (or corresponding time points) during the flash pattern period $\Delta T_{flash}$ is determined by the number of duty cycles of the PWM driving signals PWM_1 to PWM_N. For example, the more the duty cycles of the PWM driving signals, the greater the number of intensity levels, and then, the better resolution in light intensity variation, but requiring the faster computation on the percentage intensities by the microcontroller 100.

By way of example only, the bottom peak intensity (e.g., $I_{11}$ or $I_{11'}$) is an intensity corresponding to the state that the LED element (e.g., LED_1) is completely turned off, and/or the top peak intensity (e.g., Imax or Imax') is a 0

Further, although it is illustrated FIG. 2 that the first and second top peak intensities $I_{1max}$ and $I_{max'}$ (and the first and second top bottom intensities $I_{11}$ and $I_{11'}$) have the same levels as each other, embodiments of the present disclosure are not limited thereto. For example, the top peak intensities (and the bottom peak intensities) can dynamically vary over time.

Referring back to FIG. 1, the resulting computed percentage intensities with respect to each LED element LED_1 to LED_N are stored in the memory 120. The percentage intensities can be provided as digital intensity data $DATA_1$ to $DATA_N$ to the PWM driver 200 through one or more I/O interfaces of the microcontroller 100. The intensity data $DATA_1$ to $DATA_N$ correspond to the plurality of LED elements LED_1 to LED_N of the LED array 30, respectively. Next, the PWM driver 200 receives the intensity data $DATA_1$ to $DATA_N$ and generates corresponding PWM driving signals PWM_1 to PWM_N to a respective of the LED elements LED_1 to LED_N, based on a corresponding one of the intensity data $DATA_1$ to $DATA_N$. Then, the generated PWM driving signals PWM_1 to PWM_N are provided to a corresponding one of the LED elements LED_1 to LED_N. The PWM driving signals PWM_1 to PWM_N may be current signals each having a duty cycle. Thus, when an LED element is driven by the PWM driving signal, the light intensity of the LED element depends on the duty cycle of the PWM driving signal.

For example, referring back to FIG. 2, the PWM driving signal PWM_1 is applied to the LED element LED_1 for adjusting the light intensity thereof. At a time t1 (and/or t1'), the duty cycle of the PWM driving signal PWM_1 is a predetermined minimum value (or zero %); e.g., when the duty cycle of the PWM driving signal PWM_1 is zero %, the LED element LED_1 is completely turned off. In addition, at a time tmax (and/or tmax'), the duty cycle of the PWM driving signal PWM_1 is a predetermined maximum value (or 100%); e.g., when the duty cycle of the PWM driving signal PWM_1 is 100%, the LED element LED_1 is completely turned on.

Referring further to FIG. 3, as for the LED element LED_1, only observing a first flash cycle between t1 to t1' as an example, the microcontroller 100 computes percentage intensities $I_{11}$ to $I_{11'}$ that correspond to a plurality of time points t1 to t1', respectively and output intensity data $DATA_{11}$ to $DATA_{11'}$ (corresponding to the percentage intensities $I_{11}$ to $I_{11'}$, respectively) to the PWM driver 200. The PWM driver 200 generates a PWM driving signal PWM_1 based on the intensity data $DATA_{11}$ to $DATA_{11'}$. The duty cycle of the PWM driving signal PWM_1 varies from $DC_{11}$ to $DC_{11'}$ in order which correspond to the intensity data $DATA_{11}$ to $DATA_{11'}$, respectively.

Similar descriptions can be applied for light intensity control of the other LED elements LED_2 to LED_N. For example, for an LED element LED_k (k is an integer, 2≤k≤N), the microcontroller 100 computes percentage intensities $I_{k1}$ to $I_{k1'}$ that correspond to a plurality of time points t1 to t1', respectively and output intensity data $DATA_{k1}$ to $DATA_{k1'}$ (corresponding to the percentage intensities $I_{k1}$ to $I_{k1'}$, respectively) to the PWM driver 200. The PWM driver 200 generates a PWM driving signal PWM_k based on the intensity data $DATA_{k1}$ to $DATA_{k1'}$. The duty cycle of the PWM driving signal PWM_k varies from $DC_{k1}$ to $DC_{k1'}$ in order which correspond to the intensity data $DATA_{k1}$ to $DATA_{k1'}$, respectively.

FIGS. 4A to 4D illustrate example diagrams of a PWM driving signal PWM_1 whose duty cycle varies to adjust light intensity of the LED element LED_1 according to an embodiment of the present disclosure.

Referring to FIGS. 3 and 4A, in response to the output intensity data $DATA_{11}$ associated with a time t1, the duty cycle of the PWM driving signal PWM_1 is set to be $DC_{11}$, and thus, the LED element LED_1 emits light based on the PWM driving signal PWM_1. Intensity of the light emitted by the LED element LED_1 corresponds to the percentage intensity $I_{11}$.

Figure 5A:
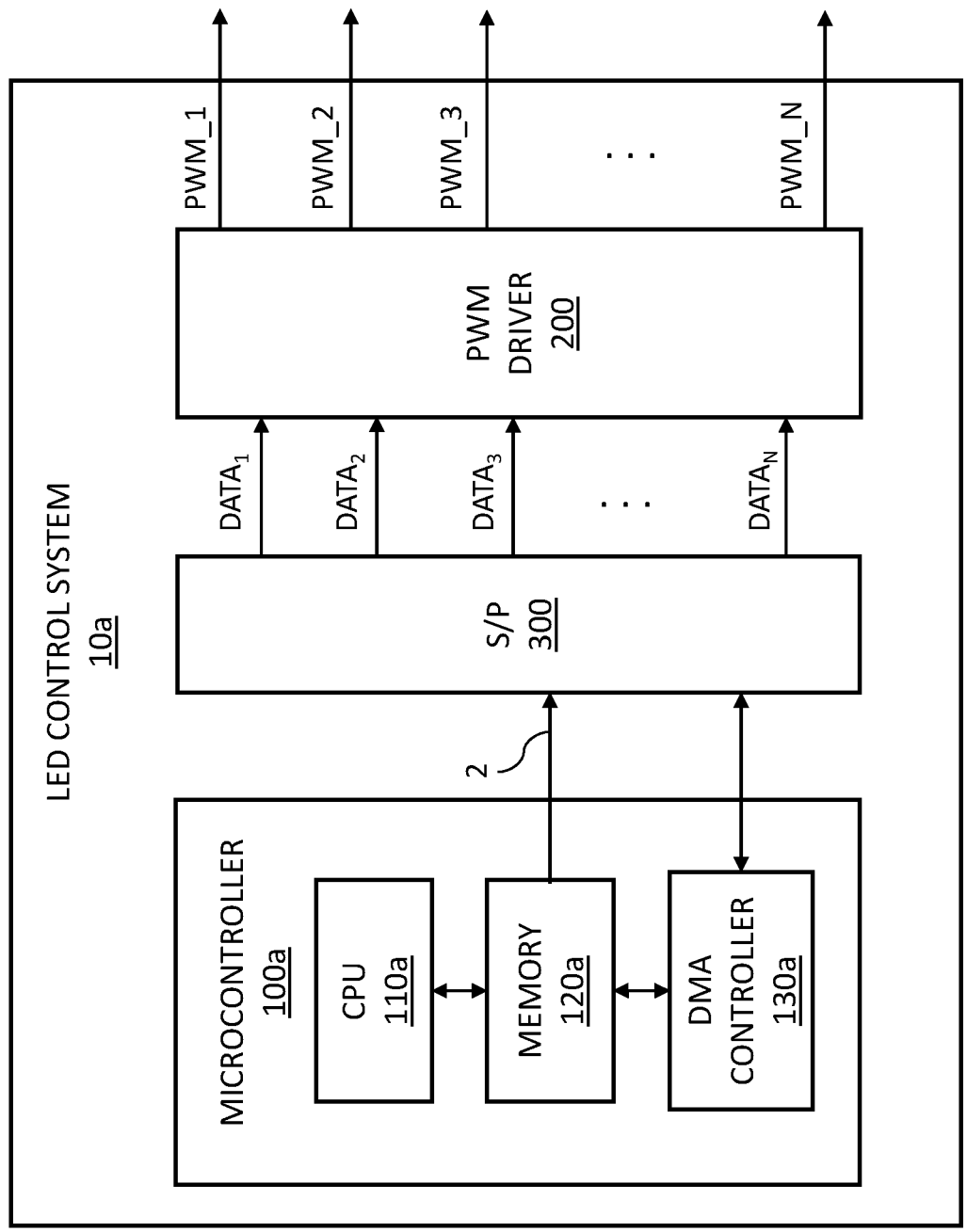
FIG. 5A is a block diagram of an example LED control system including a microcontroller with a DMA feature, a serial-to-parallel converter, and a pulse width modulation driver, according to an exemplary embodiment of the present disclosure.
Figure 5B:
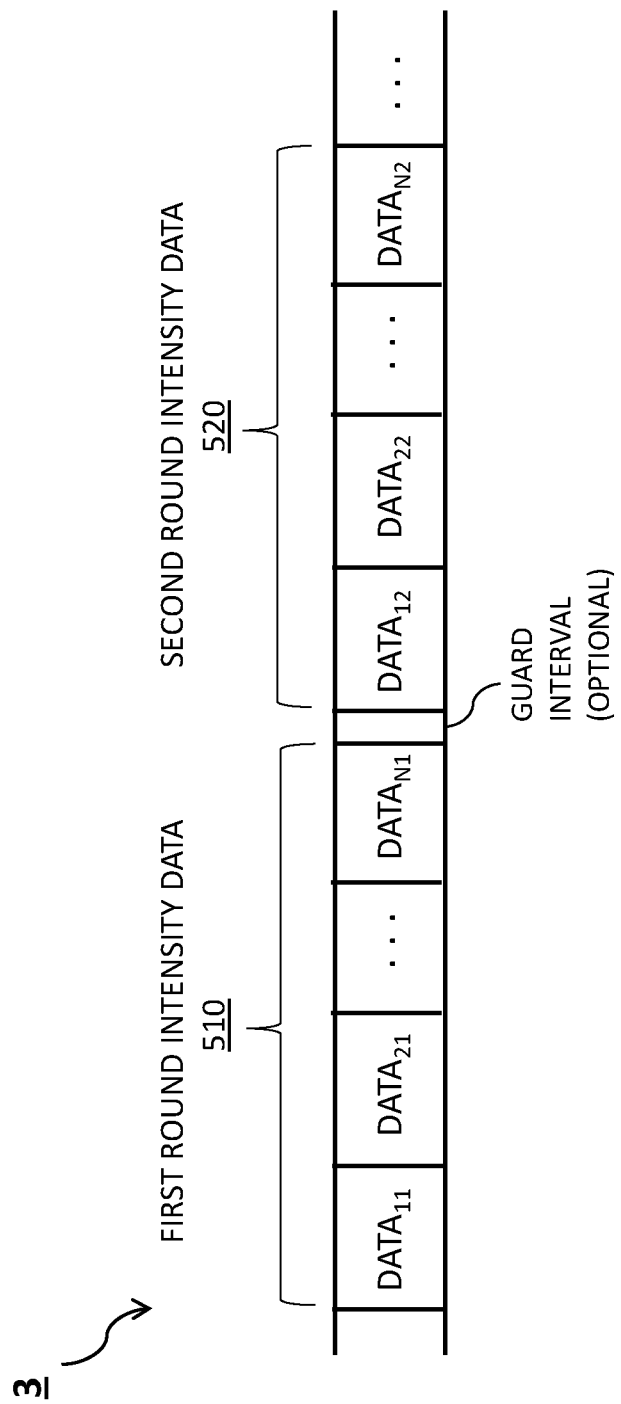
FIG. 5B is an example diagram illustrating serial data transmitted to a PWM driver according to an exemplary embodiment of the present disclosure.

In addition, referring to FIGS. 3 and 5B, in response to the output intensity data $DATA_{12}$ associated with a time t2, the duty cycle of the PWM driving signal PWM_1 is set to be $DC_{12}$ which is greater than $DC_{11}$, and thus, the LED element LED_1 emits light based on the PWM driving signal PWM_1. Intensity of the light emitted by the LED element LED_1 corresponds to the percentage intensity 112.

Similarly, referring to FIGS. 3 and 4C, in response to the output intensity data $DATA_{13}$ associated with a time t3, the duty cycle of the PWM driving signal PWM_1 is set to be $DC_{13}$ which is greater than $DC_{11}$ and $DC_{12}$, and thus, the LED element LED_1 emits light based on the PWM driving signal PWM_1. Intensity of the light emitted by the LED element LED_1 corresponds to the percentage intensity 113.

Further, referring to FIGS. 3 and 4D, in response to the output intensity data $DATA_{1max}$ associated with a time tmax, the duty cycle of the PWM driving signal PWM_1 is set to be $DC_{1max}$ which is greater than $DC_{11}$, $DC_{12}$ and $DC_{13}$, and thus, the LED element LED_1 emits light based on the PWM driving signal PWM_1. Intensity of the light emitted by the LED element LED_1 corresponds to the percentage intensity $I_{1max}$.

It should be noted that the duty cycle of a PWM driving signal according to an embodiment of the present disclosure is adjusted to have one or more intermediate values between its minimum value and maximum value, so that the intensity of light emitted by an LED element ramps up and down. On the contrary, in the conventional emergency lighting systems simply turning on and off a light source, the PWM driving signal may only have two duty cycle states corresponding to the light's turned-on and turned-off states, respectively.

Referring back to FIG. 2, the flash light pattern of an LED element should be visible or recognizable by drivers at night. To this end, the flash pattern period $\Delta T_{flash}$ of an LED element is selected to ensure that a $1/\Delta T_{flash}$ is lower than a frequency (e.g., 50 Hz) that the human's eye can perceive; e.g., $\Delta T_{flash}$ is longer than 20 ms. In addition, the light intensity of an LED element varies every predetermined time interval (e.g., $\Delta T_{si}$=t2−t1) according to variation of the duty cycle of the PWM driving signal PWM_1. For example, at a time t1, the duty cycle of the PWM driving signal PWM_1 is $DC_{11}$ which remains unchanged during an interval of t1 to t2, and at a time t2, the duty cycle is changed from $DC_{11}$ to $DC_{12}$ and remains unchanged during an interval of t2 to t3, and thus, the intensity variation curve 2 of the LED may vary in a step-wise manner (not shown). Although not shown in figures, similar descriptions can be applied for light intensity control of the other LED elements LED_2 to LED_N.

To this end, it is conceivable that the intensity data (e.g., $DATA_{11}$ to $DATA_{11'}$) are (e.g., sequentially) provided to the PWM driver 200 every predetermined sampling interval $\Delta T_{si}$, so that the duty cycle of the PWM driving signal PWM_1 varies every predetermined sampling interval $\Delta T_{si}$ to have the LED element emit with corresponding light intensities (e.g., $I_{11}$ to $I_{11'}$) at the respective time points (e.g., t1 to t1'). Thus, it is required that the microcontroller 100 is capable of working at a computation speed to cover the above-mentioned features. In other words, the microcontroller 100 should have capability of computing the percentage intensities and output the corresponding output intensity data every sampling interval $\Delta T_{si}$ for the respective LED elements LED_1 to LED_N, independently. The more the LED elements in a light array to be controlled, the higher the speed requirement for a microcontroller will be.

By way of example only, in case a turn-on period of a PWM driving signal (e.g., PWM_1) is 50 μs, then the sampling interval $\Delta T_{si}$ will be 50 μs×M; M is an integer and denotes the number of PWM cycles required to each percentage intensity sample. For example, if M is 10, the sampling interval $\Delta T_{si}$ will be 500 μs. Further, given that the number of the LED elements is N, the load imposed on a microcontroller will be increased as the number of the LED elements is increased.

Thus, as shown in FIG. 1, if the CPU 110 of the LED control system 10 has a computation speed fast enough to cover the above-mentioned features, the intensity data $DATA_1$ to $DATA_N$ can be output via the multiple I/O interfaces to the PWM driver 200.

Figure 6:
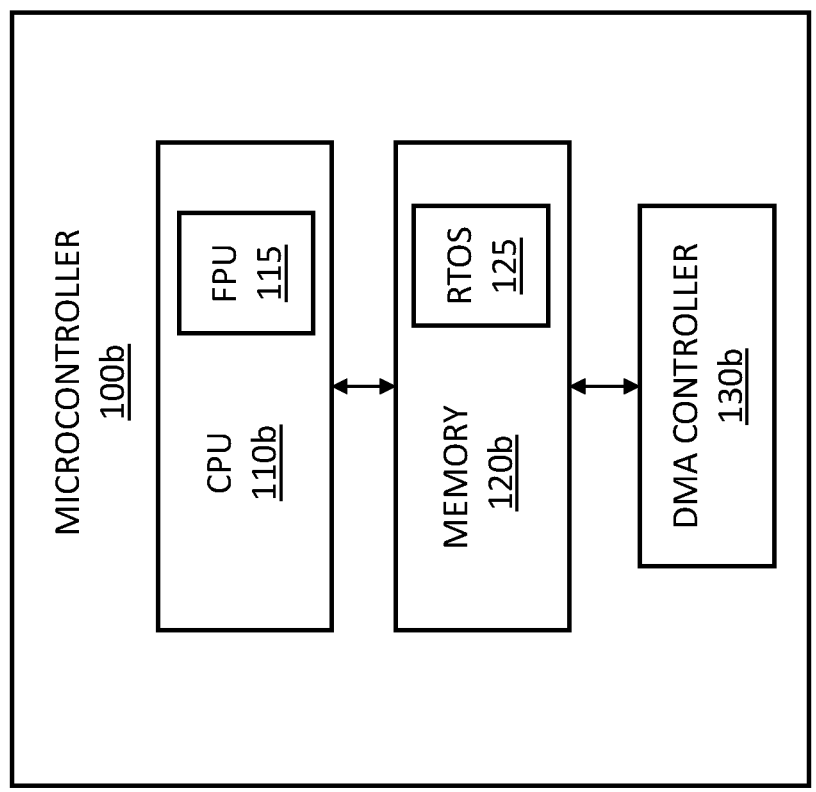
FIG. 6 is a block diagram of an example microcontroller to which a floating point unit and a real-time operating system are implemented, according to an exemplary embodiment of the present disclosure.

In some embodiments, in order to ease the load imposed on the microcontroller, a LED control system can further be modified to include additional features such as direct-memory access (DMA), a serial-to-parallel (S/P) converter, a floating-point unit (FPU) and/or a real-time operating system (RTOS), as exemplarily illustrated in FIGS. 5A and 6.

In one embodiment, referring to FIG. 5A, illustrated is a LED control system 10a including a microcontroller 100a with a DMA controller 130a, a S/P converter 300 and a PWM driver 200, according to an exemplary embodiment of the present disclosure. The microcontroller 100a includes a CPU 110a and memory 120a coupled to the CPU 110a.

Compared to the LED control system 10 of FIG. 1, the LED control system 10a further includes: a DMA controller 130a in the microcontroller 100a for supporting the DMA feature; and the S/P converter 300. Thus, duplicate description thereof will be omitted for the sake of simplicity.

Referring still to FIG. 5A, the S/P converter 300 can be implemented using one or more shift registers supporting a high serial bit rate (e.g., on the order of 10 Mbps). The microcontroller 100a has the DMA controller 130a to support the DMA feature, which allows the S/P converter 300 to directly access to the memory 120a without interrupting the CPU 110a to read the intensity data $DATA_1$ to $DATA_N$ from the memory 120a. For example, the DMA feature allows serial transfer of the intensity data $DATA_1$ to $DATA_N$ to the PWM driver 200 through the S/P converter 300. In one embodiment, due to the DMA feature, the serial data 3 can be outputted with a minimal interruption to the CPU 110a or without any interruption.

FIG. 5B is an example diagram illustrating the serial data 3 transmitted to the PWM driver 200. The microcontroller 100a outputs the first round of intensity data $DATA_{11}$ to $DATA_{N1}$ corresponding to the LED elements LED_1 to LED_N, e.g., at a time t1, and then outputs the second round of intensity data $DATA_{12}$ to $DATA_{N2}$, e.g., at a time t2. An optional guard interval can be placed between the first round of intensity data and the second round of intensity data. Owing to the DMA feature and the S/P converter 300 illustrated in FIG. 5A, the number of CPU cycles (e.g., clocks) required for the CPU 110a to output the LED elements LED_1 to LED_N can be reduced, and thus, the CPU's availability for computing the percentage intensities can be maximized.

In another embodiment for further easing the load on a CPU and maximizing its availability to computation for the percentage intensities, e.g., in real-time, a microcontroller is designed to include the floating-point unit (FPU) and/or the real-time operating system (RTOS).

FIG. 6 is a block diagram of an example microcontroller 100b to which an FPU 115 and a real-time operating system (RTOS) 125 are implemented, according to an exemplary embodiment of the present disclosure.

Referring now to FIG. 6, the FPU 115 is integrated into a CPU 110b, or implemented as a separate part from the CPU 110b, and is configured to perform floating point (e.g., non-integer numbers) calculations. This allows faster calculation on the floating points, compared to calculation only using a CPU (e.g., 110a) without the FPU 115. The floating-point calculation is necessary for timely computing the percentage intensities associated with the respective LED elements LED_1 to LED_N, so that the real-time operation can be achieved.

An RTOS is known as a computing environment that computes tasks within a specific time constrains (e.g., real-time computing). The use of an RTOS permits computation of percentage intensities for each LED element (e.g., lighting element states) to occur asynchronously from the lighting element control such as generating of intensity data and generating of a PWM driving signal for each LED element based on the intensity data. Despite the use of DMA feature, control of the LED elements may impose much load on a CPU due to the high frequency PWM cycle. The RTOS reclaims precious CPU cycles while the LED element control is idle, such as during DMA transfers. This can minimize the impact that the computational algorithms have on the timing of LED element states changes. Otherwise, a significantly more expensive microcontroller would be required for this functionality.

Figure 7:
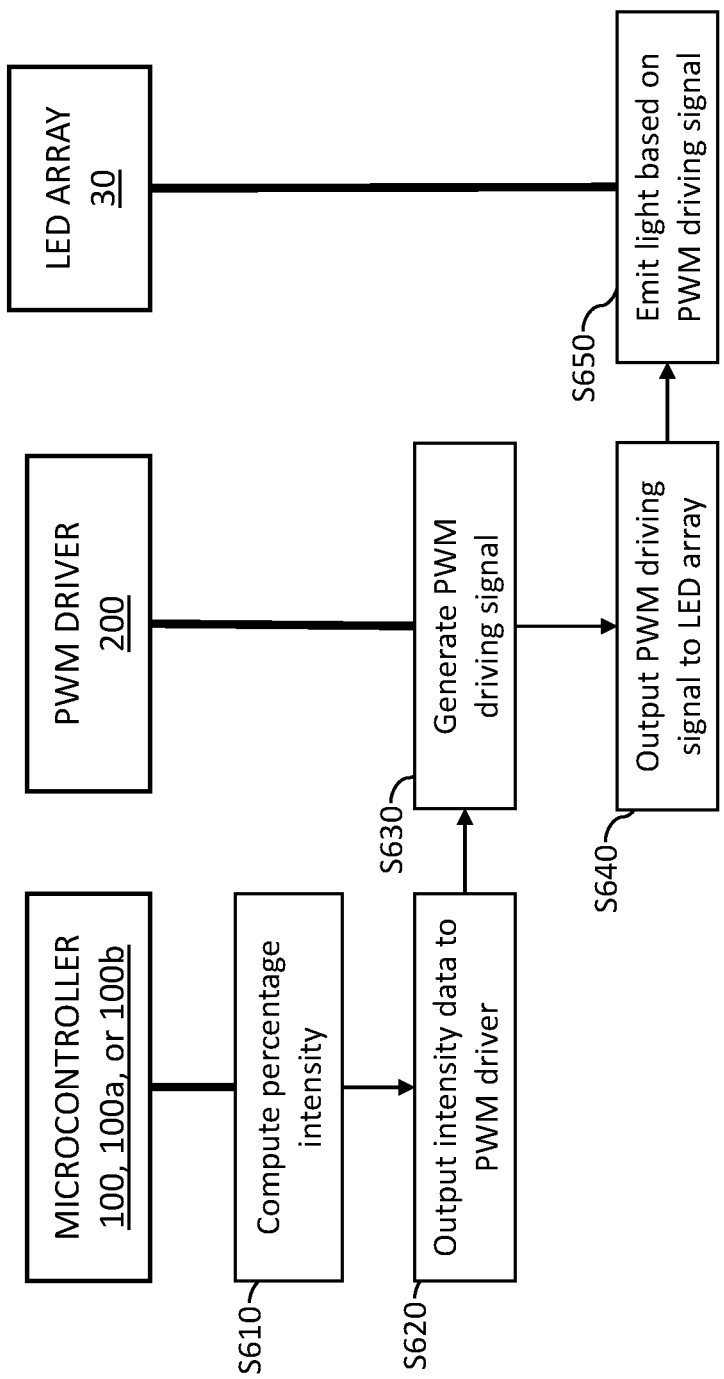
FIG. 7 is a flow chart illustrating a method for controlling an LED array according to an exemplary embodiment of the present disclosure.

FIG. 7 is a flow chart illustrating a method for controlling an LED array 30 according to an exemplary embodiment of the present disclosure.

Referring now to FIGS. 1-7, a microcontroller (e.g., 100 of FIG. 1, 100a of FIG. 5A and 100b of FIG. 6) computes percentage light intensities for each LED element (e.g., LED_1 to LED_N) of an LED array 30 (S610) and outputs intensity data (e.g., $DATA_1$ to $DATA_N$) associated with the percentage intensities to a PWM driver 200 (S620). In one embodiment, the percentage light intensities of each LED element ramp up to a top peak and ramp down to a low peak repeatedly, thus forming a flash light pattern of the LED element.

Next, the PWM driver 200 generates a respective PWM driving signal (e.g., PWM_1 to PWM_N) for each LED element based on the received intensity data (S630) and outputs the generated PWM driving signal to each LED element (S640). The duty cycle of the PWM driving signal varies according to the percentage light intensity identified by the intensity data received from the microcontroller (e.g., 100, 100a or 100b). The higher the percentage light intensity, the higher the duty cycle, or vice versa. Each LED element of the LED array 30 emits light whose intensity is controlled based on the duty cycle of the PWM driving signal (S650).

Figure 8:
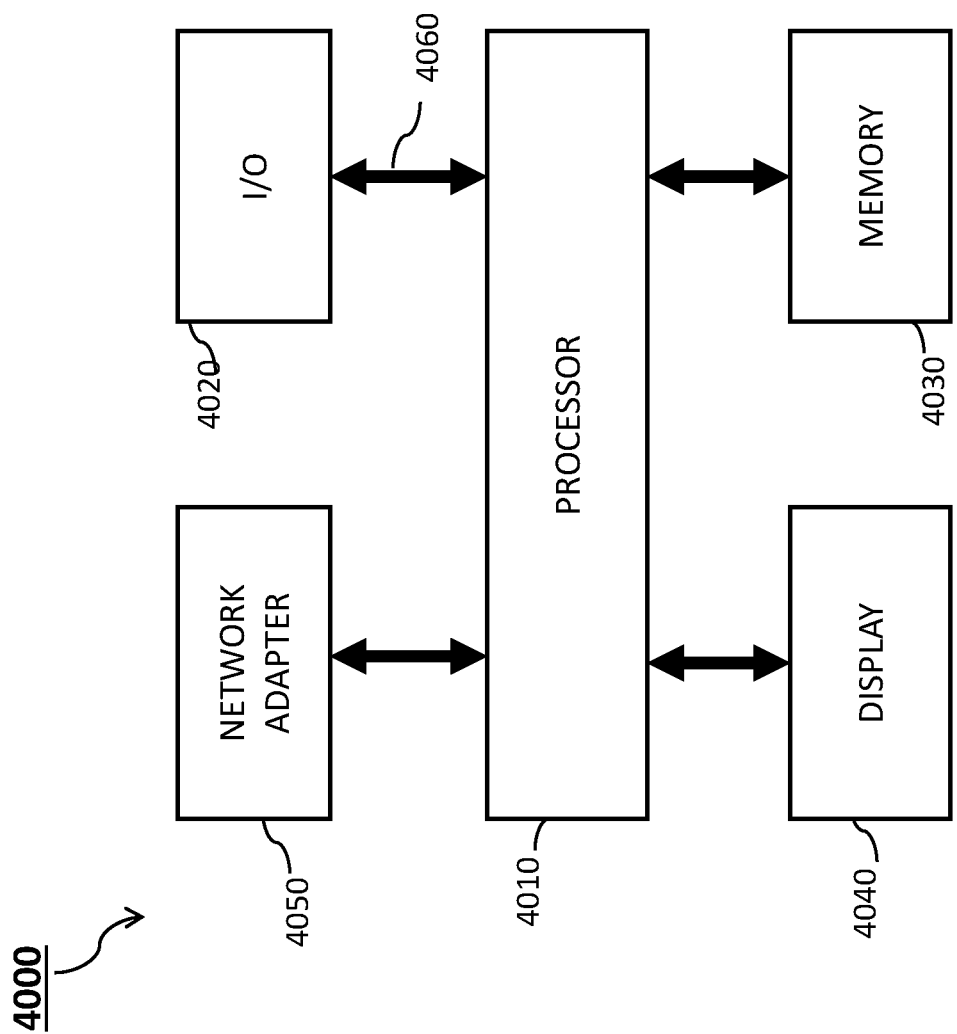
FIG. 8 is a block diagram of a computing system according to an exemplary embodiment of the present disclosure.

FIG. 8 is a block diagram of a computing system 4000 according to an exemplary embodiment of the present disclosure.

Referring to FIG. 8, the computing system 4000 may be used as a platform for performing: the functions or operations described hereinabove with respect to at least one of the control system 10 of FIG. 1 and/or control systems each including one of the microcontroller 100a and 100b; and the method described with reference to FIG. 7.

Referring to FIG. 8, the computing system 4000 may include a processor 4010, I/O devices 4020, a memory system 4030, a display device 4040, and/or a network adaptor 4050.

The processor 4010 may drive the I/O devices 4020, the memory system 4030, the display device 4040, and/or the network adaptor 4050 through a bus 4060.

The computing system 4000 may include a program module for performing: the functions or operations described hereinabove with respect to at least one of the control system 10 of FIG. 1 and/or control systems each including one of the microcontroller 100a and 100b; and the method described with reference to FIG. 7. For example, the program module may include routines, programs, objects, components, logic, data structures, or the like, for performing particular tasks or implement particular abstract data types. The processor (e.g., 4010) of the computing system 4000 may execute instructions written in the program module to perform: the functions or operations described hereinabove with respect to at least one of the control system 10 of FIG. 1 and/or control systems each including one of the microcontroller 100a and 100b; and the method described with reference to FIG. 7. The program module may be programmed into the integrated circuits of the processor (e.g., 4010). In an exemplary embodiment, the program module may be stored in the memory system (e.g., 4030) or in a remote computer system storage media.

The computing system 4000 may include a variety of computing system readable media. Such media may be any available media that is accessible by the computer system (e.g., 4000), and it may include both volatile and non-volatile media, removable and non-removable media.

The memory system (e.g., 4030) can include computer system readable media in the form of volatile memory, such as RAM and/or cache memory or others. The computer system (e.g., 4000) may further include other removable/non-removable, volatile/non-volatile computer system storage media.

The computer system (e.g., 4000) may communicate with one or more devices using the network adapter (e.g., 4050). The network adapter may support wired communications based on Internet, local area network (LAN), wide area network (WAN), or the like, or wireless communications based on code division multiple access (CDMA), global system for mobile communication (GSM), wideband CDMA, CDMA-2000, time division multiple access (TDMA), long term evolution (LTE), wireless LAN, Bluetooth, Zig Bee, or the like.

Exemplary embodiments of the present disclosure may include a system, a method, and/or a non-transitory computer readable storage medium. The non-transitory computer readable storage medium (e.g., the memory system 4030) has computer readable program instructions thereon for causing a processor to carry out aspects of the present disclosure.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EEPROM or Flash memory), a static random access memory (SRAM), a portable compact disc read-only memory (CD-ROM), a digital versatile disk (DVD), a memory stick, a floppy disk, or the like, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to the computing system 4000 from the computer readable storage medium or to an external computer or external storage device via a network. The network may include copper transmission cables, optical transmission fibers, wireless transmission, routers, firewalls, switches, gateway computers and/or edge servers. A network adapter card (e.g., 4050) or network interface in each computing/processing device receives computer readable program instructions from the network and forwards the computer readable program instructions for storage in a computer readable storage medium within the computing system.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the computing system (e.g., 4000) through any type of network, including a LAN or a WAN, or the connection may be made to an external computer (for example, through the Internet using an Internet Service Provider). In an exemplary embodiment, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, system (or device), and computer program products (or computer readable medium). It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description but is not intended to be exhaustive or limited to the present disclosure in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated but fall within the scope of the appended claims.

What is claimed is:

1. A lighting system, comprising:
   a controller configured to generate a plurality of driving control signals; and
   a light source comprising a plurality of light emitting diode elements in an array configured to receive the plurality of driving control signals and emit light based on the driving control signal, wherein the plurality of driving control signals comprise a driving control signal for each light emitting diode element in the array such that each of the light emitting diode elements can be independently controlled,
   wherein intensity of the light emitted from each light emitting diode element in the array of the light source ramps up and ramps down repeatedly with a first period based on the driving control signal for each light emitting diode.

2. The lighting system of claim 1, wherein the driving control signal for each light emitting diode in the array is generated based on a plurality of intensity values of the light source computed by the controller, each of the plurality of intensity values corresponding to a respective plurality of time points.

3. The lighting system of claim 2, wherein at least one parameter of the driving control signal for each light emitting diode in the array is gradually adjusted to have at least one intermediate value between a maximum value corresponding to a top peak of the intensity of the light and a minimum value corresponding to a bottom peak of the intensity of the light.

4. The lighting system of claim 2, wherein the driving control signal for each light emitting diode in the array is based on a pulse width modulation signal, and the controller is further configured to adjust a duty cycle of the pulse width modulation signal based on each of the computed plurality of intensity values to generate the driving control signal.

5. The lighting system of claim 3, wherein the driving control signal for each light emitting diode in the array is based on a pulse width modulation signal, and the at least one parameter of the driving control signal is a duty cycle of the pulse width modulation signal.

6. The lighting system of claim 4, wherein the controller is further configured to, for the driving control signal for each light emitting diode in the array:
   adjust the duty cycle of the pulse width modulation signal to a first duty cycle at a first of the time points, based on a first of the computed plurality of intensity values;
   control the light emitting diode to emit the light with the first intensity value;
   adjust the duty cycle of the pulse width modulation signal to a second duty cycle at a second of the time points, based on a second of the computed plurality of intensity values; and
   control the light emitting diode to emit the light with the second intensity value, the second time point being adjacent to the first time point.

7. The lighting system of claim 6, wherein the duty cycle of the pulse width modulation signal adjusted at the first time point is maintained until the second time point.

8. The lighting system of claim 6, wherein the duty cycle of the driving control signal gradually varies between the first time point and the second time point from the first duty cycle to the second duty cycle.

9. The lighting system of claim 3, further comprising another light source,
   wherein the controller is further configured to generate another driving control signal, and the another light source is configured to receive the another driving control signal and emit another light based on the another driving control signal, and
   wherein intensity of the another light emitted from the another light source ramps up and ramps down repeatedly with a second period based on the driving control signal.

10. The lighting system of claim 9, wherein the second period is different from the first period.

11. The lighting system of claim 9, wherein at least one of the maximum value and the minimum value of the driving control signal is different from a corresponding one of the another driving control signal.

12. The lighting system of claim 9, wherein the another light source and the light source are implemented with a light array bar.

13. The lighting system of claim 2, wherein the controller further comprises a pulse width modulation driver configured to generate the driving control signals for each light emitting diode based on the plurality of intensity values.

14. The lighting system of claim 1, wherein the controller further comprises at least one of a direct-memory access controller, a serial-to-parallel converter, a floating point unit and a real-time operating system.

15. A method for driving a lighting system, comprising:
   generating, by a controller, a plurality of driving control signals;
   receiving, by a light source comprising a plurality of light emitting diode elements in an array, the plurality of driving control signals, wherein the plurality of driving control signals comprise a driving control signal for each light emitting diode element in the array such that each of the light emitting diode elements can be independently controlled; and
   emitting, by the light source, light based on the driving control signals,
   wherein intensity of the light emitted from each light emitting diode element in the array of the light source ramps up and ramps down repeatedly with a first period based on the driving control signal for each light emitting diode.

16. The method of claim 15, further comprising:
   computing, by the controller, a plurality of intensity values of the light source corresponding to a respective plurality of time points; and
   generating, by the controller, the driving control signal for each light emitting diode in the array based on the computed plurality of intensity values.

17. The method of claim 16, wherein at least one parameter of the driving control signal for each light emitting diode in the array is gradually adjusted to have at least one intermediate value between a maximum value corresponding to a top peak of the intensity of the light and a minimum value corresponding to a bottom peak of the intensity of the light.

18. The method of claim 16, wherein the driving control signal for each light emitting diode in the array is based on a pulse width modulation signal, and the method further comprises adjusting, by the controller, a duty cycle of the pulse with modulation signal based each of the computed plurality of intensity values.

19. The method of claim 17, wherein the driving control signal for each light emitting diode in the array is based on a pulse width modulation signal, and the at least one parameter of the driving control signal is a duty cycle of the pulse width modulation signal.

20. The method of claim 17, further comprising:
generating, by the controller, another driving control signal;
receiving, by another light source, the another driving control signal; and
emitting, by the another light source, another light based on the another driving control signal,
wherein intensity of the another light emitted from the another light source ramps up and ramps down repeatedly with a second period based on the driving control signal.

21. The method of claim 20, wherein the second period is different from the first period.

22. The method of claim 20, wherein at least one of the maximum value and the minimum value of the driving control signals is different from a corresponding one of the another driving control signal.

23. A non-transitory computer-readable storage medium having computer readable program instructions, the computer readable program instructions read and executed by at least one processor for performing a method for driving a lighting system, the method comprises:
generating a plurality of driving control signals;
receiving, by a light source comprising a plurality of light emitting diode elements in an array, the plurality of driving control signals, wherein the plurality of driving control signals comprise a driving control signal for each light emitting diode element in the array such that each of the light emitting diode elements can be independently controlled; and
emitting, by the light source, light based on the driving control signals, wherein intensity of the light emitted from each light emitting diode element in the array of the light source ramps up and ramps down repeatedly with a first period based on the driving control signal for each light emitting diode.

24. The medium of claim 23, wherein the method further comprises:
computing a plurality of intensity values of the light source corresponding to a respective plurality of time points; and
generating the driving control signal for each light emitting diode in the array based on the computed plurality of intensity values.

25. The medium of claim 24, wherein at least one parameter of the driving control signal for each light emitting diode in the array is gradually adjusted to have at least one intermediate value between a maximum value corresponding to a top peak of the intensity of the light and a minimum value corresponding to a bottom peak of the intensity of the light.

26. The medium of claim 24, wherein the driving control signal for each light emitting diode in the array is based on a pulse width modulation signal, and the method further comprises adjusting a duty cycle of the pulse with modulation signal based each of the computed plurality of intensity values.

27. The medium of claim 25, wherein the method further comprises:
generating, by the controller, another driving control signal
receiving, by another light source, the another driving control signal; and
emitting, by the another light source, another light based on the another driving control signal,
wherein intensity of the another light emitted from the another light source ramps up and ramps down repeatedly with a second period based on the driving control signal.

28. The medium of claim 27, wherein the second period is different from the first period.

29. The medium of claim 27, wherein at least one of the maximum value and the minimum value of the driving control signal is different from a corresponding one of the another driving control signal.

* * * * *